United States Patent [19]

Iwasa et al.

[11] Patent Number: 4,755,548
[45] Date of Patent: Jul. 5, 1988

[54] ADHESIVE COMPOSITION

[75] Inventors: Tadanobu Iwasa; Toshikatsu Kanehara; Hideyuki Fujiwara, all of Aichi, Japan

[73] Assignee: Toyoda Gosei Co., Ltd., Nishikasugai, Japan

[21] Appl. No.: 836,157

[22] Filed: Mar. 4, 1986

[30] Foreign Application Priority Data

Mar. 5, 1985 [JP] Japan .................................. 60-43421
Mar. 5, 1985 [JP] Japan .................................. 60-43422

[51] Int. Cl.$^4$ .............................. C09J 3/12; C09J 7/02; B32B 15/06
[52] U.S. Cl. .................................... 524/202; 428/457; 428/465; 525/232; 525/240; 525/404
[58] Field of Search ............... 428/457, 466, 465; 524/822, 202, 705; 525/232, 240, 404

[56] References Cited

U.S. PATENT DOCUMENTS

| 3,108,035 | 10/1963 | Rappaport et al. ............... 428/466 |
| 3,865,772 | 2/1975 | Hulyalkar ....................... 524/822 X |
| 4,115,614 | 9/1978 | Martin, Jr. ..................... 428/466 X |
| 4,181,648 | 1/1980 | Honsberg ........................ 524/202 |
| 4,327,150 | 4/1982 | White et al. .................... 428/466 X |
| 4,593,062 | 6/1986 | Puydak et al. ................... 525/232 X |
| 4,603,164 | 7/1986 | Chmiel et al. ................... 525/232 X |

FOREIGN PATENT DOCUMENTS 1402418 8/1975 United Kingdom ............... 524/202

Primary Examiner—Thomas J. Herbert
Attorney, Agent, or Firm—Cushman, Darby & Cushman

[57] ABSTRACT

An adhesive composition useful for adhesion of rubber to metal is produced by dissolving a chlorinated type polymer and a petroleum resin, optionally in combination with a dithiocarbamate, in an organic solvent.

9 Claims, 1 Drawing Sheet

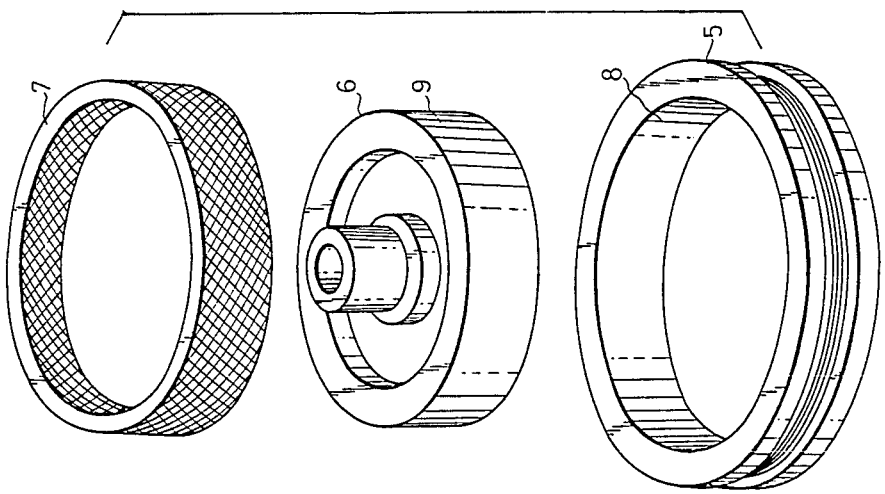
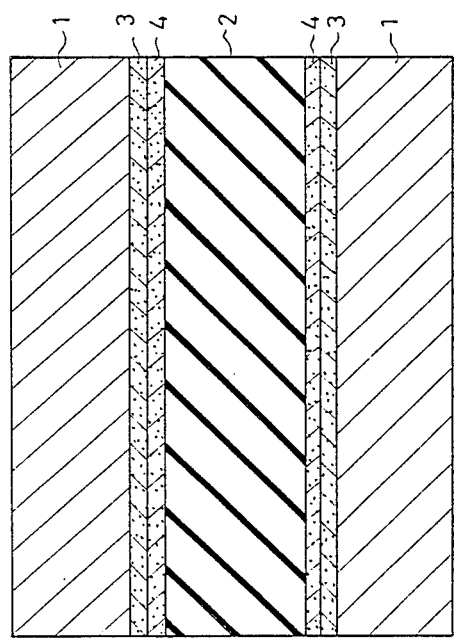
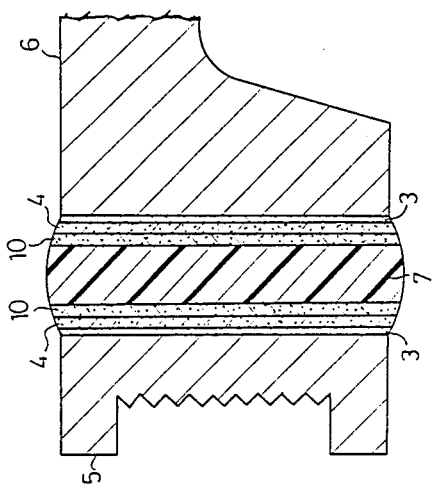

ADHESIVE COMPOSITION

BACKGROUND OF THE INVENTION

1. Field of the Invention

This invention relates to an adhesive composition for use with rubber, and more particularly to an adhesive composition to be used for the purpose of enhancing tight adhesion between rubber and metal.

2. Description of the Related Art

This invention has bearing upon adhesive compositions formed of chlorinated type polymers.

The chlorinated type polymers comprise an adhesive polymer obtained by chlorinating natural rubber or a varying kind of synthetic rubber and a small amount of a cross-linking agent added thereto. Some of these chlorinated type polymers incorporate therein reinforcing agents such as carbon black as occasion demands. They are used for the purpose of providing adhesion between rubber and metal.

Adhesion between rubber and metal by the use of such a chlorinated type polymer as described above is attained by a method which comprises applying the adhesive polymer on the surface of rubber or metal intended for contact, then joining the rubber and the metal fast across the surface of contact, and pressing them against each other under application of heat. When this polymer is to be used in an atmosphere of elevated temperatures like a rubber vibration isolator attached to a metal housing of an automobile, a phenolic resin type primer is applied in advance on the contact surface of metal for the purpose of enhancing the tightness of adhesion between the rubber and the metal.

The chlorinated type polymer, however, deteriorates gradually on protracted exposure to the atmosphere of elevated temperatures. In spite of the use of the primer, therefore, there are times when the adhesive force gradually grows weaker to a point where separation occurs between the rubber and the metal.

SUMMARY OF THE INVENTION

An object of this invention is to provide an adhesive composition for forming fast adhesion between rubber and metal, and particularly an adhesive composition which curbs deterioration of tightness of adhesion and prevents separation between rubber and metal over a long time even when the rubber is subject to protracted exposure to the atmosphere of elevated temperatures and is apt to undergo thermal deterioration like the rubber vibration isolator attached to a metal housing in an automobile.

To attain the object described above, the adhesive composition of the present invention comprises a chlorinated type polymer and a petroleum resin or comprises a chlorinated type polymer, a petroleum resin, and dithiocarbamate.

The other objects of the present invention will become apparent as the disclosure is made in the following description of a preferred embodiment of the invention and the appended claims. Many advantages of the invention not mentioned in the specification will become apparent to those skilled in the art through working of the invention.

BRIEF DESCRIPTION OF THE DRAWINGS

FIG. 1 is a cross section illustrating a typical use of an adhesive composition embodying the present invention in the formation of adhesion between a rubber piece and an iron plate.

FIG. 2 and FIG. 3 illustrate another typical use of the adhesive agent embodying the present invention as adhesive agent for a damper pulley: FIG. 2 is a cross section illustrating part of the damper pulley in which a rubber member has been inserted under pressure. FIG. 3 is an exploded perspective view illustrating the construction of the damper pulley.

DETAILED DESCRIPTION OF THE PREFERRED EMBODIMENTS

First, the components which make up the adhesive composition of the present invention will be described below.

The term "chlorinated type polymer" means a rubber which is obtained by chlorinating natural rubber or a varying synthetic rubber. As concrete examples of the chlorinated type polymer, there can be cited chlorinated natural rubber, chloroprene rubber, chlorinated isobutylene-isoprene rubber, chlorosulfonated polyethylene, chlorinated ethylene-propylene rubber, chlorinated polyethylene, chlorinated polypropylene, epichlorohydrin rubber, polyvinyl chloride thermoplastic elastomer, and chlorinated polyethylene elastomer.

The term "petroleum resin" means an adhesive resin having a softening point in the range of 0 to 120° C. and a fixed carbon content in the range of 15 to 30% and obtained by polymerizing diolefins and monoolefins present in the cracked fraction byproduced in an ethylene plant. Concrete examples of the petroleum resin are aliphatic petroleum resins formed preponderantly of copolymers such as 2-methyl butene ($C_5$ type petroleum resins), aromatic type petroleum resins formed preponderantly of copolymers such as styrene, vinyl toluene, α-methyl styrene, and indene ($C_9$ type petroleum resins), and $C_5C_9$ copolymer petroleum resins using the two types of resins mentioned above as raw materials.

The term "dithiocarbamate" means sodium salts of dialkyldithiocarbamic acids represented by the general formula:

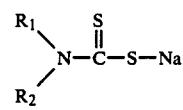

(wherein $R_1$ and $R_2$ independently stand for an alkyl group) such as, for example, sodium dimethyldithiocarbamate, sodium diethyldithiocarbamate, and sodium dibutyldithiocarbamate, zinc salts and nickel salts of dialkyldithiocarbamic acids represented by the general formula:

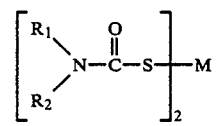

(wherein $R_1$ and $R_2$ independently stand for an alkyl group and M stands for a metal such as Zn or Ni) such as, for example, zinc dimethyldithiocarbamate, zinc diethyldithiocarbamate, zinc dibutyldithiocarbamate, nickel dibutyldithiocarbamate, and such compounds as piperidium pentamethylenedithiocarbamate and pipecolin pipecolyldithiocarbamate which are used as vulcanization accelerators.

The mixing ratio of the chlorinated type polymer and the petroleum resin should be such that the amount of the latter component falls in the range of 10 to 100 parts by weight based on 100 parts by weight of the former component. If the amount of the petroleum resin is not more than 10 parts by weight or not less than 100 parts by weight, the tightness of adhesion obtained by the produced adhesive composition is not sufficient.

When the adhesive composition is to incorporate therein the dithiocarbamate additionally therein, the amount of the dithiocarbamate should fall in the range of 2 to 20 parts by weight based on 100 parts by weight of the chlorinated polymer.

If the amount of the dithiocarbamate is not more than 2 parts by weight, the tightness of adhesion is not sufficient. If it exceeds 20 parts by weight, the excess does not contribute to increasing the tightness of adhesion any further.

The adhesive composition of the present invention is obtained by mixing the aforementioned components thereof in an organic solvent.

The organic solvent to be used in this case is one member or a mixture of two or more members selected from the group consisting of hydrocarbons, chlorinated hydrocarbons, aromatic hydrocarbons, acetic esters, and ketones. This selection may be suitably made in due consideration of the compatibility of the solvent with the chlorinated polymer and rubber mentioned above. Any other organic solvent than the organic solvents cited above may be used for the mixing on condition that the organic solvent is incapable of reacting with the chlorine in the chlorinated polymer.

The adhesive composition, when necessary, may further incorporate therein well-known cross-linking agent and filler suitable for rubber.

Examples of the rubber for which the adhesive composition is intended to provide tight adhesion with metal include polyisoprene rubber (IR), butadiene rubber (BR), styrene-butadiene rubber (SBR), chloroprene rubber (CR), acrylonitrile-butadiene rubber (NBR), isobutylene-isoprene rubber (IIR), ethylene-propylene rubber (EPM), ethylene-propylene-diene rubber (EPDM), acrylic rubber (ACM), urethane rubber, and various rubbers formed of the aforementioned chlorinated type polymers in addition to natural rubber. In other words, the adhesive compostion can be used effectively for virtually all kinds of rubbers.

The adhesion of rubber and metal by the use of the adhesive composition is attained by applying the adhesive composition on the contact surface of the rubber and/or the metal, joining the rubber and the metal across the contact surface, and pressing them against each other under application of pressure and heat. In this case, the contact surface of the metal may be coated with a primer in advance for the purpose of enhancing the tightness of adhesion between the rubber and the metal. As the primer for this purpose, a phenolic resin type primer which is additionally usable as a cross-linking agent can be used optimally.

The rubber may be an unvulcanized rubber or a vulcanized rubber. When an unvulcanized rubber is to be used, it is desired to incorporate therein various additives such as antioxidant and antiozonating agent and then vulcanized at the time of adhesion.

Now, the first working example embodying the present invention in forming adhesion between a rubber piece and a metal plate will be described below.

In this working example, a chlorosulfonated polyethylene type adhesive agent (produced by Lord Corporation and marketed under trademark designation "Chemlok-252") was used as the chlorinated type polymer, an aromatic type petroleum resin (produced by Fuji Kosan Co., Ltd. and marketed under trademark designation of "Fukkol Resin, FR-L") as the petroleum resin, and nickel dibutyldithiocarbamate (produced by Ouchi Shinko Chemical Industry Co., Ltd. and marketed under trademark designation of "Nocrac-NBC") as the dithiocarbamate respectively.

First, the components indicated in Table 1 were mixed to obtain an adhesive composition A. (All the "parts" indicated in the following tables are invariably meant as "parts by weight.")

TABLE 1

| | |
|---|---|
| Chemlock-252 (solids) | 100.0 parts |
| Fukkol Resin, FR-L | 10.0 parts |
| Nocrac-NBC | 2.0 parts |

A vulcanized NR measuring 50×50×5 mm was produced by press vulcanizing an unvulcanized blend indicated in Table-2 at 160° C. for 15 minutes.

TABLE 2

| | |
|---|---|
| NR | 100.0 parts |
| HAF Carbon black | 60.0 parts |
| Naphthenic processed oil | 15.0 parts |
| Paraffin wax | 1.0 part |
| Zinc oxide | 5.0 parts |
| Antioxidant | 1.5 parts |
| Vulcanization accelerator | 1.0 part |
| Sulfur | 1.5 parts |

The paraffin wax was a product of OuchiShinko Chemical Industry Co., Ltd. marketed under trademark designation of "Sunnoc." As the antioxidant, a mixture consisting of 1.0 part of 2,2,4-trimethyl-1, 2-hydroquinone (produced by Ouchi Shinko Chemical Industry Co., Ltd. and marketed under trademark designation of "Nocrac-224") and 0.5 part of N-phenyl-N-isopropyl-p-phenylene diamine (produced by the same company and marketed under trademark designation of Nocrac-810N" was used. As the vulcanization accelerator, N-cyclohexyl-2-benzothiazole sulfenamide was used.

Then, the contact surfaces of two iron plates measuring 50×50×3 mm were degreased with trichloroethylene and abraded by grid blast, coated with a phenolic resin type primer (produced by Lord Corporation and marketed under trademark designation of "chemlok-205"), and dried at 50° C. for 10 minutes. The adhesive composition A was applied on the layers of primer on the iron plates.

Subsequently, the aforementioned vulcanized NR was nipped between the contact surfaces of the two iron plates and the two iron plates were pressed against each other across the nipped vulcanized NR until the the thickness of vulcanized NR decreased by about 25%. The two iron plates and the intervening vulcanized NR in situ were placed in a constant temperature bath at 150° C. and left standing therein for 40 minutes to effect adhesion between the iron plates and the rubber.

FIG. 1 illustrates the condition of adhesion so produced. Between the two iron plates 1 is nipped the rubber 2. The rubber adheres to each of the iron plates 1 through the medium of a primer 3 and an adhesive composition 4.

To test the composite so produced for tightness of adhesion between the rubber and the iron plates, one sample of the composite was left standing at room temperature for 24 hours following the adhesion and another sample left standing in a constant temperature at 120° C. for 10 days and then tested for tensile shear strength and mode of rupture with the aid of an autograph. The results were as shown in Table 3. The term "mode of rupture" (R/RC) as used herein means the surface area ratio of the ruptured part (=R) of the material of rubber to the ruptured part (=RC) of the boundary between the rubber and the adhesive composition, providing that R/RC=100/0 represents the ideal value.

Various adhesive compositions, B through J, were produced by changing the mixing ratio of the components of the aforementioned adhesive composition A. With each of the adhesive compositions, the adhesion of rubber and iron plates was repeated and the produced composite was tested similarly for tensile shear strength and mode of rupture. The results were as shown in Table 3.

In Table 3, the data indicated by Comparative Experiment 1 represent the values of measurement obtained by the conventional technique involving sole use of a chlorinated type polymer. Comparison of these data difference in tensile shear strength after thermal deterioration was particularly conspicuous.

In Comparative Experiment 2, an excessive incorporation of petroleum resin resulted in loss of tightness of adhesion.

Then, a vulcanized Cl-IIR measuring 50×50×5 mm was produced by press vulcanizing an unvulcanized Cl-IIR blend indicated in Table 4.

TABLE 4

| | |
|---|---|
| Cl-IIR | 100.0 parts |
| HAF Carbon black | 90.0 parts |
| Naphthenic processed oil | 20.0 parts |
| Stearic acid | 1.0 part |
| Zinc oxide | 5.0 parts |
| Vulcanization accelerator | 1.0 part |
| Sulfur | 1.5 parts |

As the Cl-IIR, a chlorinated isobutylene-isoprene rubber (produced by Exxon Corporation and marketed under trademark designation of "Chlorobutyl HT-1068") was used. As the vulcanization accelerator, N,N'-diethylthiourea was used.

Then, with each of the aforementioned adhesive compositions, A through J, adhesion of rubber and iron plates was effected by repeating the procedure described above. The composites so produced were then tested for tensile shear strength and mode of rupture. The results was as shown in Table 5.

TABLE 3

| Adhesive composition | | | A | B | C | D | E | F | G | H | I | J | Comp Exp 1 | Com Exp 2 |
|---|---|---|---|---|---|---|---|---|---|---|---|---|---|---|
| Chemlock-252 (solids), (parts) | | | 100 | 100 | 100 | 100 | 100 | 100 | 100 | 100 | 100 | 100 | 100 | 100 |
| Fukkol Resin, FR-L (parts) | | | 10 | 20 | 30 | 40 | 50 | 60 | 70 | 80 | 90 | 100 | 0 | 150 |
| Nocrac-NBC (parts) | | | 2 | 4 | 6 | 8 | 10 | 12 | 14 | 16 | 18 | 20 | 0 | 2 |
| Tightness of adhesion | Before deterioration | Tensile shear strength (Kg/cm$^2$) | 44 | 47 | 52 | 53 | 53 | 52 | 49 | 44 | 39 | 32 | 27 | 25 |
| | | Mode of rupture (R/RC) | 80/20 | 100/0 | 100/0 | 100/0 | 100/0 | 100/0 | 100/0 | 90/10 | 80/20 | 70/30 | 40/60 | 40/60 |
| | After thermal deterioration | Tensile shear strength (Kg/cm$^2$) | 30 | 33 | 34 | 36 | 35 | 36 | 33 | 34 | 31 | 23 | 18 | 20 |
| | | Mode of rupture (R/RC) | 90/10 | 100/0 | 100/0 | 100/0 | 100/0 | 100/0 | 100/0 | 100/0 | 90/10 | 80/20 | 50/50 | 80/20 |

TABLE 5

| Adhesive composition | | | A | B | C | D | E | F | G | H | I | J | Comp Exp 1 | Comp Exp 2 |
|---|---|---|---|---|---|---|---|---|---|---|---|---|---|---|
| Chemlock-252 (solids), (parts) | | | 100 | 100 | 100 | 100 | 100 | 100 | 100 | 100 | 100 | 100 | 100 | 100 |
| Fukkol Resin, FR-L (Parts) | | | 10 | 20 | 30 | 40 | 50 | 60 | 70 | 80 | 90 | 100 | 0 | 150 |
| Nocrac-NBC (parts) | | | 2 | 4 | 6 | 8 | 10 | 12 | 14 | 16 | 18 | 20 | 0 | 2 |
| Tightness of adhesion | Before deterioration | Tensile shear strength (Kg/cm$^2$) | 45 | 47 | 48 | 50 | 50 | 51 | 50 | 51 | 46 | 45 | 35 | 28 |
| | | Mode of rupture (R/RC) | 85/12 | 90/10 | 95/10 | 100/0 | 100/0 | 100/0 | 100/0 | 100/0 | 90/10 | 85/15 | 70/30 | 40/60 |
| | After thermal deterioration | Tensile shear strength (Kg/cm$^2$) | 19 | 22 | 27 | 30 | 33 | 35 | 38 | 38 | 32 | 30 | 15 | 15 |
| | | Mode of rupture (R/RC) | 40/60 | 50/50 | 70/30 | 85/15 | 100/0 | 100/0 | 100/0 | 100/0 | 95/05 | 90/10 | 30/70 | 30/70 | with those of the adhesive compositions, A through J, of this invention clearly reveals that the adhesion composition of the comparative experiment was inferior in both tensile shear strength and mode of rupture. The It is noted from the results that the composites produced by using the adhesive compositions, A through J, excelled the composite produced by using the adhesive composition of the conventional technique (Comparative Experiment 1) in terms of tensile shear strength and mode of rupture.

Since the adhesive composition of the present invention permits faster adhesion between rubber and metal than the countertype of the conventional technique and retains the adhesion powerfully even after thermal deterioration as demonstrated above, it is highly useful as an adhesive agent for rubber and metal.

Now, the second working example embodying the present invention in the adhesion of a damper pulley which is one kind of rubber vibration isolator for attachment to a metal housing in an automobile will be described below.

The damper pulley, as illustrated in FIG. 3, was composed of a pulley rim 5 which is an outer housing, an inner hub 6 which is an inner housing, and a rubber ring 7.

The rubber ring 7 of the damper pulley was inserted under pressure in the gap intervening between the pulley rim 5 and the inner hub 6. The contact surfaces of the pulley rim 5 and the rubber ring 7 and those of the inner hub 6 and the rubber ring 7 were severally coated with a primer and an adhesive agent.

In the conventional countertype of this invention, a phenolic resin type polymer is used as the primer and a chlorinated type polymer as the adhesive agent as described above.

The difference between the inner diameter of the pulley rim 5 and the outer diameter of the inner hub 6 was designed to be about 20 to 30% less than the wall thickness of the rubber ring 7. Preparatorily to the insertion of the rubber ring 7 under pressure, therefore, a pressure-insertion liquid was applied on the surface of the rubber ring 7 for the purpose of facilitating the insertion. In the conventional countertype of this invention, a paraffin type, naphthene type, or aromatic type processed oil is used as the pressure-insertion liquid.

The inner peripheral surface 8 of the pulley rim 5 and the outer peripheral surface 9 of the inner hub 6 were each degreased with trichloroethylene, abraded by grid blast, coated with a phenolic resin type primer (produced by Lord Corporation and marketed under trademark designation of Chemlock-205"), and dried at 50° C. for 10 minutes.

On the layer of the primer, an adhesive composition K indicated in Table 6 was superposed.

TABLE 6

| Chemlock-252 (solids) | 100.0 parts |
| Fukkol Resin FR-L | 10.0 parts |

Separately, a rubber ring 7 was produced by press vulcanizing the unvulcanized NR blend indicated in Table 2 at 160° C. for 15 minutes. A processed oil was applied on the surface of this rubber ring 7.

The processed oil used in this case was a naphthene type processed oil (produced by Fuji Kosan Co., Ltd. and marketed under trademark designation of "Fukkol Flex #1060N").

This rubber ring 7 was pressed into the gap between the pulley rim 5 and the inner hub 6 under the conditions of 100 mm/min. of speed and 22 kg/cm$^2$ of load. FIG. 2 is a cross section illustrating the damper pulley in the state assumed after the insertion of the rubber ring. The inner periphery 8 of the pulley rim 5 and the outer periphery 9 of the inner hub 6 were each coated with a primer 3 and an adhesive composition 4. Between the pulley rib 5 and the inner hub 6, the rubber ring 7 having a processed oil 10 applied on the opposite surfaces thereof was inserted under pressure. Subsequently, the composite was left standing in a constant temperature bath at 150° C. for 30 minutes to effect adhesion of the rubber ring 7 to the housing.

For the purpose of testing the composite for tightness of adhesion between the rubber ring 7 and the housing, one sample of the composite was left standing at room temperature for 24 hours and another sample thereof left standing in a constant bath at 120° C. for 10 days and they were tested for tensile shear strength and mode of rupture by the use of an autograph. The results are shown in Table 7 together with the results obtained of the composites produced by using adhesive compositions, L through T, prepared by changing the mixing ratio of the components of the aforementioned adhesive composition K.

As the pressure-insertion liquid, three types of processed oil were used: They were (A) a naphthene type processed oil (produced by Fuji Kosan Co., Ltd. and marketed under trademark designation of Fukkol Flex #1060N"), (B) a paraffin type processed oil (produced by the same company and marketed under trademark designation of "Fukkol Flex P-100"), and (C) an aromatic type processed oil (produced by the same company and marketed under trademark designation of "Fukkol flex EPX #1").

TABLE 7

| Adhesion composition | | K | L | M | N | O | P | Q | R | S | T | Comp Exp 1 | Comp Exp 2 |
|---|---|---|---|---|---|---|---|---|---|---|---|---|---|
| Chemlock-252 (solids) (parts) | | 100 | 100 | 100 | 100 | 100 | 100 | 100 | 100 | 100 | 100 | 100 | 100 |
| Fukkol Resin FR-L (parts) | | 10 | 20 | 30 | 40 | 50 | 60 | 70 | 80 | 90 | 100 | 0 | 150 |
| Pressure-insertion liquid (processed oil) | | A | A | A | A | A | A | A | A | B | C | A | A |
| Pressure-insertion load (kg/cm$^2$) | | 22 | 21 | 21 | 20 | 19 | 18 | 18 | 17 | 16 | 15 | 34 | 14 |
| Smoothness of pressure-insertion | | Good | Good | Good | Good | Good | Good | Good | Good | Good | Good | Poor | Good |
| Tightness of adhesion | Before deterioration | Tensile shear strength (Kg/cm$^2$) | 40 | 44 | 47 | 49 | 50 | 50 | 48 | 46 | 45 | 40 | 27 | 25 |
| | | Mode of rupture (R/RC) | 75/25 | 90/10 | 100/0 | 100/0 | 100/0 | 100/0 | 100/0 | 95/05 | 90/10 | 80/20 | 40/60 | 40/60 |
| | After thermal deterioration | Tensile shear strength (Kg/cm$^2$) | 29 | 33 | 33 | 35 | 36 | 36 | 35 | 33 | 32 | 30 | 18 | 15 |
| | | Mode of rupture | 80/20 | 100/0 | 100/0 | 100/0 | 100/0 | 100/0 | 100/0 | 100/0 | 100/0 | 95/05 | 50/50 | 80/20 |

TABLE 7-continued

| Adhesion composition | K | L | M | N | O | P | Q | R | S | T | Comp Exp 1 | Comp Exp 2 |
|---|---|---|---|---|---|---|---|---|---|---|---|---|
| (R/RC) | | | | | | | | | | | | |

From the results, it is noted that the composites produced by the use of the adhesive compositions, K through T, invariably excelled the composite produced by the use of the adhesive agent of the conventional countertype (Comparative Experiment 1) in terms of tensile shear strength and mode of rupture and they retained the tightness of adhesion even after thermal deterioration.

As described above, the adhesive composition of the present invention enables a rubber member to adhere with great tightness to a metal housing as compared with the adhesive composition of the conventional technique and permits the tightness of adhesion to be retained even after thermal deterioration. Thus, it is highly useful as an adhesive agent for the damper pulley.

Further, since the adhesive composition of the present invention exhibits high adhesive force for rubber, it can be utilized for the mutual adhesion of two rubber members or for the adhesion of a rubber member to a synthetic resin member. In this case, the application of the aforementioned primer may be omitted.

Obviously many modifications and variations of the present invention are possible in the light of the teachings described above without departure from the spirit and scope of this invention as set forth in the appended claims hereof.

What is claimed is:

1. An adhesive composition, comprising:
   100 parts by weight of a chlorinated polymer;
   10 to 100 parts by weight of a petroleum resin having a softening point in the range of 0° to 120° C.; and an organic solvent, both said chlorinated polymer and said petroleum resin being incorporated in said organic solvent.

2. An adhesive composition according to claim 1, wherein:
   2 to 20 parts by weight of a dithiocarbamate is additionally incorporated in said organic solvent, based on 100 parts by weight of said chlorinated polymer.

3. The adhesive composition of claim 1, wherein:
   said organic solvent is constituted by at least one member selected from the group consisting of hydrocarbons, chlorinated hydrocarbons, aromatic hydrocarbons, acetic esters, and ketones.

4. The adhesive composition of claim 1, wherein:
   the chlorinated polymer is constituted by at least one member selected from the group consisting of chlorinated natural rubber, chloroprene rubber, chlorinated isobutylene-isoprene rubber, chlorosulfonated polyethylene, chlorinated ethylene-propylene rubber, chlorinated polyethylene, chlorinated polypropylene, epichlorohydrin rubber, polyvinyl chloride thermoplastic elastomer, and chlorinated polyethylene elastomer.

5. The adhesive composition of claim 4, wherein:
   said petroleum resin has a fixed carbon content in the range of 15 to 30 percent.

6. The adhesive composition of claim 5, wherein:
   the petrolum resin is constituted by at least one member selected from the group consisting of an aliphatic petroleum resin formed preponderantly of at least one of $C_5$, $C_9$ and $C_5C_9$ petroleum resins, and aromatic petroleum resins formed preponderantly of copolymers of at least one of styrene, vinyl toluene, α-methyl styrene, and indene ($C_9$ type petroleum resins), and $C_5C_9$ copolymer petroleum resins.

7. The adhesive composition of claim 6, wherein:
   2 to 20 parts by weight of a dithiocarbamate is additionally incorporated in said organic solvent, based on 100 parts by weight of said chlorinated polymer.

8. The adhesive composition of claim 7, wherein:
   said dithiocarbamate is constituted by at least one member selected from the group consisting of sodium salts of dialkyldithiocarbamic acids represented by the general formula:

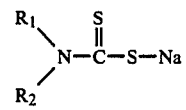

(wherein $R_1$ and $R_2$ stand for respective alkyl groups) and zinc salts and nickel salts of dialkyldithiocarbamic acids represented by the general formula:

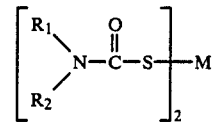

(where $R_1$ and $R_2$ stand for respective alkyl groups and M stands for a metal selected from the group consisting of Zn and Ni).

9. The adhesive composition of claim 7, wherein:
   said dithiocarbamate is constituted by at least one member selected from the group consisting of sodium dimethyldithiocarbamate, sodium diethyldithiocarbamate, zinc dimethyldithiocarbamate, zinc diethyldithiocarbamate, zinc dibutyldithiocarbamate, nickel dibutyldithiocarbamate, piperidium pentamethylenedithiocarbamate and pipecolin pipecolyldithiocarbamate.

* * * * *